(12) United States Patent
Knudson et al.

(10) Patent No.: US 11,238,863 B2
(45) Date of Patent: Feb. 1, 2022

(54) QUERY DISAMBIGUATION USING ENVIRONMENTAL AUDIO

(71) Applicant: Lenovo (Singapore) Pte. Ltd., Singapore (SG)

(72) Inventors: Ryan Charles Knudson, Durham, NC (US); Roderick Echols, Chapel Hill, NC (US); Russell Speight VanBlon, Raleigh, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 176 days.

(21) Appl. No.: 16/587,397

(22) Filed: Sep. 30, 2019

(65) Prior Publication Data

US 2021/0097984 A1  Apr. 1, 2021

(51) Int. Cl.
*G10L 15/22* (2006.01)
*G10L 15/18* (2013.01)
*G06F 16/635* (2019.01)

(52) U.S. Cl.
CPC .......... *G10L 15/22* (2013.01); *G06F 16/635* (2019.01); *G10L 15/1815* (2013.01); *G10L 2015/223* (2013.01)

(58) Field of Classification Search
USPC .................... 704/1–504, 257, 255
See application file for complete search history.

(56) References Cited

U.S. PATENT DOCUMENTS

| 10,509,437 B2 * | 12/2019 | Patterson | G06F 3/167 |
| 10,740,423 B2 * | 8/2020 | Nicholson | G06F 16/487 |
| 2015/0142704 A1 * | 5/2015 | London | G06F 40/58 706/11 |
| 2018/0232563 A1 * | 8/2018 | Albadawi | G06K 9/00348 |
| 2018/0341654 A1 * | 11/2018 | Nicholson | G06F 16/9535 |
| 2019/0212774 A1 * | 7/2019 | Patterson | G06F 1/181 |
| 2021/0097984 A1 * | 4/2021 | Knudson | G06F 16/635 |

* cited by examiner

*Primary Examiner* — Marcus T Riley
(74) *Attorney, Agent, or Firm* — Ference & Associates LLC

(57) ABSTRACT

One embodiment provides a method, including: capturing, using at least one sensor of an information handling device, environmental audio; receiving, at an audio capture device associated with the information handling device, a user query, wherein the user query comprises at least one deictic term; disambiguating, using a processor and by analyzing the captured environmental audio, the user query; and providing, based on the disambiguating, a response to the user query. Other aspects are described and claimed.

18 Claims, 3 Drawing Sheets

QUERY DISAMBIGUATION USING ENVIRONMENTAL AUDIO

BACKGROUND

Individuals often have questions about various things that they seek the answers to. For example, individuals may require directions to a location, may want recommendations for restaurants or movies, may want opinions about a topic, etc. Generally, the quickest and easiest way to obtain these answers is by interacting with an information handling device ("device"), for example, smart phone, tablet, digital assistant, laptop and/or personal computer, and the like. More particularly, an individual may provide their question to their device (e.g., to a digital assistant embodied on the device, to a search engine, etc.) that may thereafter return one or more responsive results.

BRIEF SUMMARY

In summary, one aspect provides a method, comprising: capturing, using at least one sensor of an information handling device, environmental audio; receiving, at an audio capture device associated with the information handling device, a user query, wherein the user query comprises at least one deictic term; disambiguating, using a processor and by analyzing the captured environmental audio, the user query; and providing, based on the disambiguating, a response to the user query.

Another aspect provides an information handling device, comprising: a sensor; an audio capture device; a processor; a memory device that stores instructions executable by the processor to: capture environmental audio; receive a user query, wherein the user query comprises at least one deictic term; disambiguate, by analyzing the captured environmental audio, the user query; and provide, based on the disambiguating, a response to the user query.

A further aspect provides a product, comprising: a storage device that stores code, the code being executable by a processor and comprising: code that captures environmental audio; code that receives a user query, wherein the user query comprises at least one deictic term; code that disambiguates, by analyzing the captured environmental audio, the user query; and code that provides, based on the disambiguating, a response to the user query.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
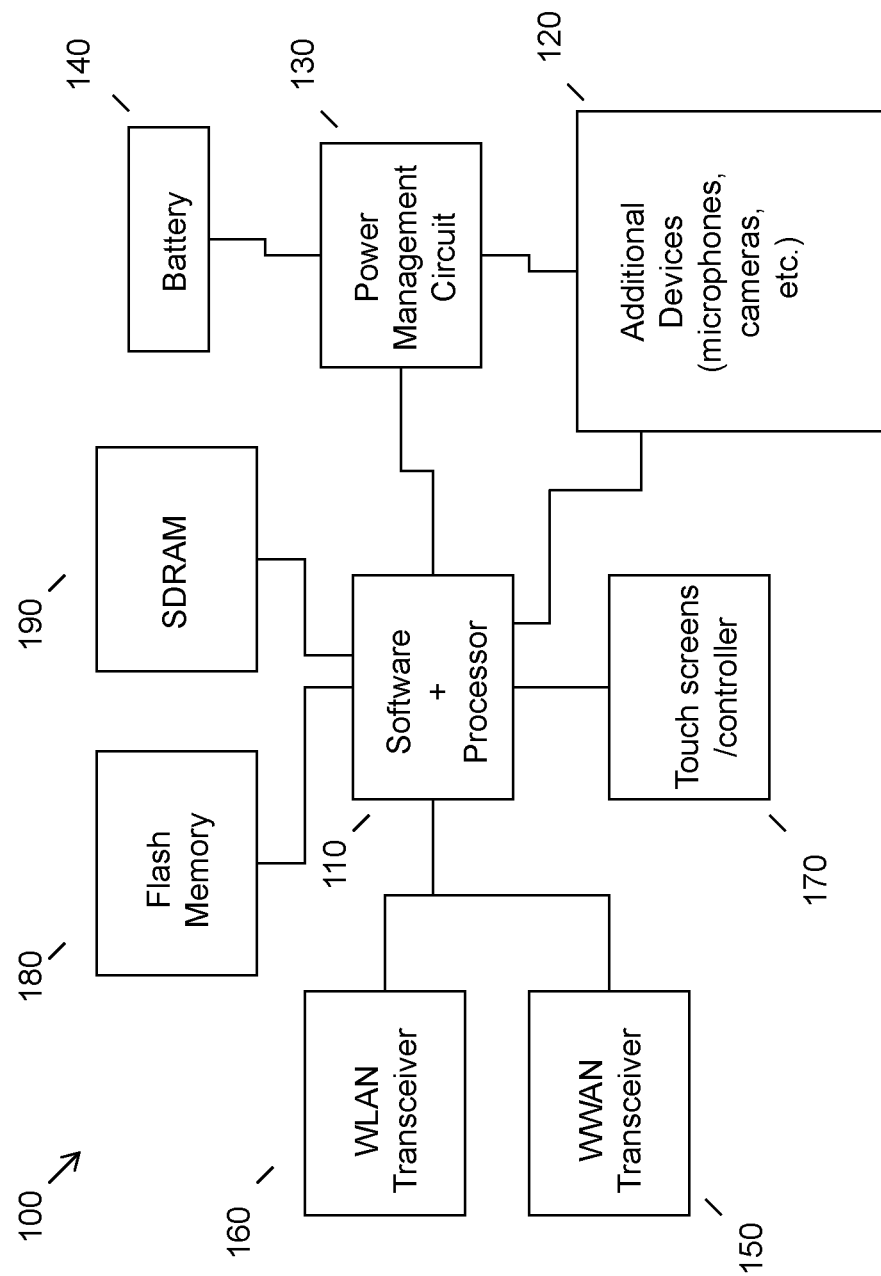
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A user query needs to be specific enough to provide a device with enough context to know what to search for. More particularly, the query generally includes an interrogative word (e.g., who, what, when, where, why, etc.) directed toward a particular subject. For example, the user query "Who starred in Movie A?" identifies a specific movie that one or more search and/or analysis functions should be performed on. Providing a device with a properly structured and contextually complete query increases the odds of receiving desired results.

Recently, efforts have been made to make interaction with a device more natural. More particularly, in lieu of providing a very structured query, a user may provide a query that may resemble a question that they would normally ask another individual. For example, instead of providing the query "Who starred in Movie A?" a user may provide the query "Who stars in this?" with reference to a currently playing movie.

Conventionally, systems may disambiguate an otherwise ambiguous word or pronoun, as shown in the example above, with reference to a media-based contextual cue. For example, conventional systems may identify currently playing television shows, songs, etc., and analyze the content associated therewith in an attempt to apply meaning to the ambiguity. Using the example described in the previous paragraph, a conventional system may receive an ambiguous user query, identify a currently playing movie, and thereafter disambiguate and process the user query using data associated with the currently playing movie. However, without data obtained from contextual media sources, existing solutions are unable to apply meaning to the ambiguous term. For example, if two individuals are discussing a movie and one of the individuals provides the query "Who starred in that?", with reference to their conversation, a conventional system may be unable to disambiguate the user query.

Accordingly, an embodiment may apply meaning to ambiguous terms in a user query by utilizing environmental audio. In an embodiment, environmental audio may be captured using a sensor of a device. The environmental audio may be, for example, conversational audio occurring between two or more individuals. Additionally or alternatively, the environmental audio may correspond to a sound stream produced by at least one of another device (e.g., a fan, a refrigerator, a laundry machine, etc.), an object (e.g., a car, etc.), another person, an animal, and the like. An embodiment may then receive a user query comprising a deictic term (e.g., a pronoun, an ambiguous word, etc.) and thereafter disambiguate the deictic term by analyzing the environmental audio. Responsive to disambiguating the user query, an embodiment may provide a response to the user. Such a method may therefore allow more natural interactions to occur between users and their devices, which would correspondingly improve the user experience.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, buses, I/O ports, etc., as is well known in the art. Internal buses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
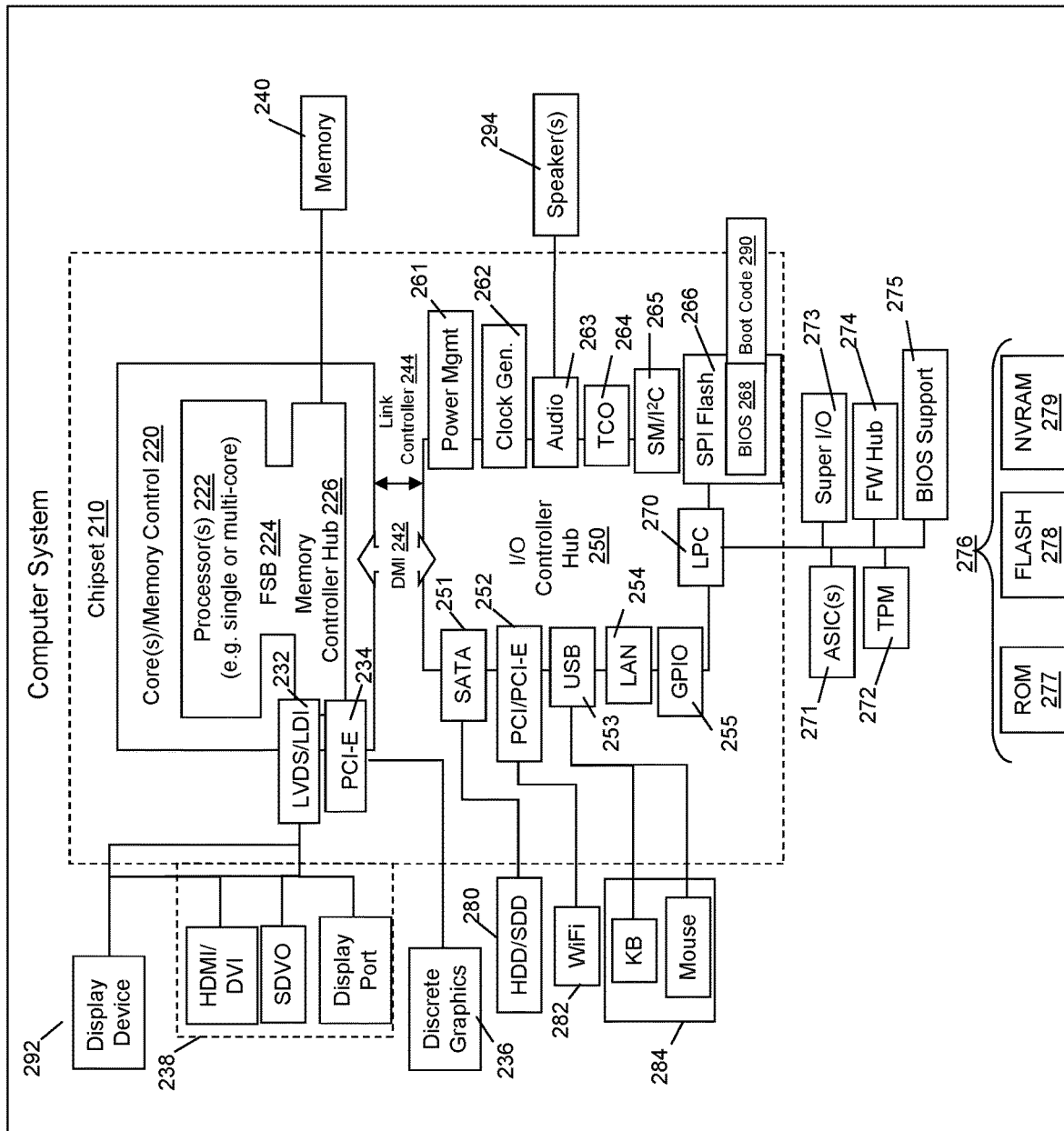
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, buses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving a user query and thereafter outputting search results corresponding to the user query. For example, the circuitry outlined in FIG. 1 may be implemented in a smart phone or tablet embodiment, whereas the circuitry outlined in FIG. 2 may be implemented in a laptop.

Figure 3:
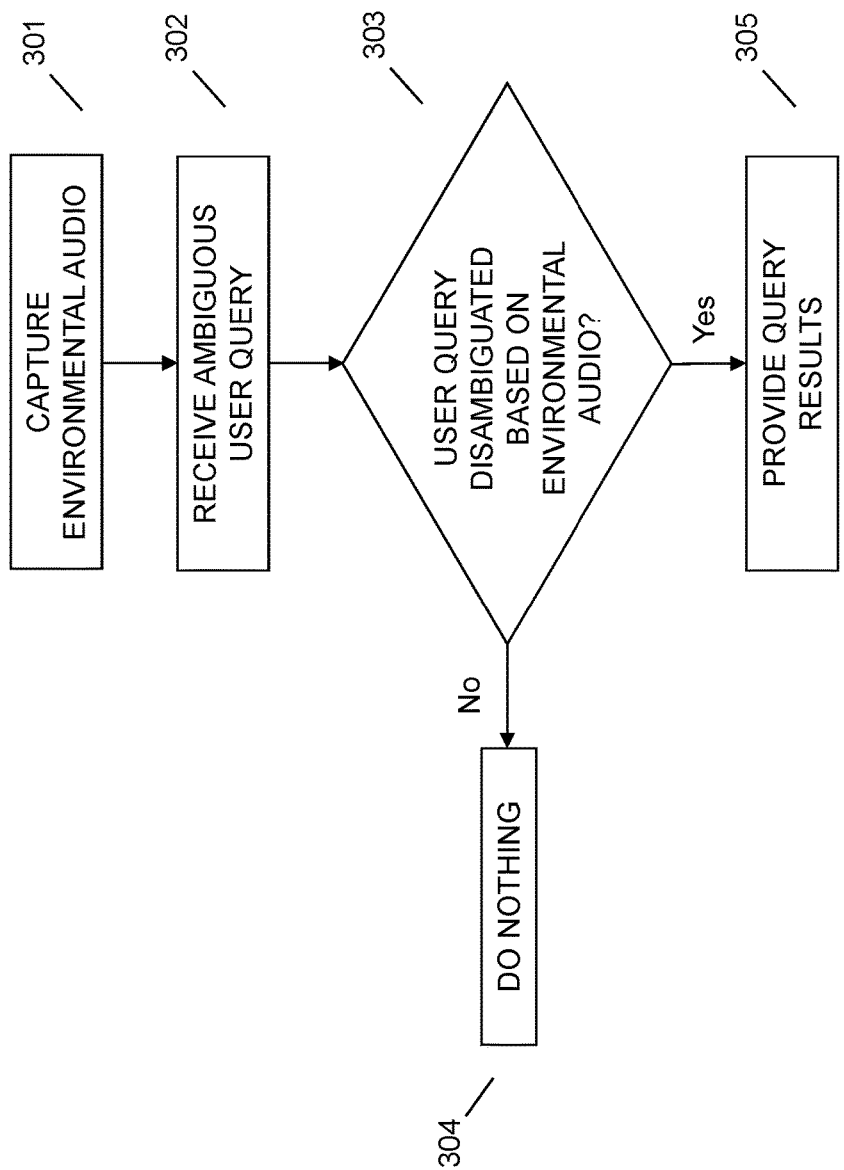
FIG. 3 illustrates an example method of disambiguating terms in a query using environmental audio.

Referring now to FIG. 3, an embodiment may disambiguate an ambiguous term in a user query by referring to environmental audio. At 301, an embodiment may capture environmental audio. The environmental audio may correspond to one or more of a variety of different audible contexts. For example, the environmental audio may correspond to a conversation occurring between two or more individuals (e.g., a conversation occurring between the user and a friend, etc.). As another example, the environmental audio may correspond to a sound stream produced by at least one of another device (e.g., a fan, a refrigerator, a laundry machine, etc.), an object (e.g., a car, etc.), another person, an animal, and the like. In an embodiment, the environmental audio may be captured by one or more audio capture devices integral to the user's device or, alternatively, integral to another device in communication with the user's device.

In an embodiment, the environmental audio may be captured continuously (e.g., from the time the device is turned on, etc.). Alternatively, the environmental audio may only be captured responsive to detection of a predetermined event. For example, an embodiment may begin capturing environmental audio responsive to detection of one or more users in proximity to a device. As another example, an embodiment may begin capturing environmental responsive to detection of a predetermined user command to capture.

In an embodiment, the environmental audio may be stored in a rolling queue (e.g., at an accessible location on the user's device or on another device or server, etc.). In an embodiment, the rolling queue may store N-seconds worth of previous environmental audio. For example, an embodiment may store 30 seconds worth of environmental audio. Once a datum of environmental audio has been stored for the maximum storage period, an embodiment may automatically remove that audio from the queue. In another embodiment, the rolling queue may store a predetermined amount of data. Once new data is obtained and added to the queue, an embodiment may remove the oldest article of data. In yet another embodiment, the rolling queue may store a running context of the environmental audio (as further described herein). In yet another embodiment, only specific data may be stored in the rolling queue. For example, a user may specify that only conversational data is stored in the queue and all other environmental data be ignored (e.g., sound data produced by other objects, animals, etc.).

At 302, an embodiment may receive a user query. In an embodiment, the user query may be received at an audio capture device (e.g., a microphone that is integral to the user's device or integral to another device in communication with the user's device, etc.). The user query may comprise at least one deictic term that makes the user query inherently ambiguous. In an embodiment, the deictic term may correspond to a deictic pronoun, which refers to an entity that must be identified according to the context of utterance. For example, in the context of a discussion about a particular movie a user may provide the query "Is that playing right now?" In this situation, the relative pronoun "that" makes the query inherently ambiguous because it is not immediately clear what "that" is referring to. In another embodiment, the deictic term may correspond to another deictic word that may make the overall user query ambiguous. For example, in the user query "Is the movie playing right now", the conventional subject of the sentence (i.e., the movie) becomes the deictic term because it is unclear which movie the user is referring to.

At 303, an embodiment may disambiguate the user query by analyzing the environmental audio. In an embodiment, the environmental audio stored in the queue may be analyzed (e.g., using one or more audio processing techniques, etc.) responsive to receiving the user query. An embodiment may then determine a context associated with the analyzed environmental audio and thereafter apply meaning to the deictic term based on this determined context. For example, a user and another individual may be having a conversation about a particular restaurant. This conversation may be captured and stored in a queue. Responsive to receiving the user query "How long does it take to drive there?" an embodiment may access and analyze the conversation in the queue, determine the subject of the conversation (i.e., the restaurant), and thereafter apply meaning to the deictic term "there" by using this determination.

In another embodiment, the environmental audio may be analyzed substantially when it is captured. An embodiment may then determine a running context associated with the analyzed environmental audio and store the running context in the queue. Responsive to receiving a user query, an embodiment may access the stored context and apply meaning to the deictic term based at least in part on the context. Such an embodiment may require less memory storage space (i.e., because only the context of a conversation is being stored rather than the entire conversation) but may correspondingly require more ongoing processing. For example, a user and another individual may be having a conversation about a particular restaurant. This conversation may be captured and immediately analyzed to determine its context (i.e., details associated with the particular restaurant). Responsive to receiving the user query "How long does it take to drive there?" an embodiment may refer to context data stored in the queue to predict that the user is referring to the restaurant.

Responsive to being unable to disambiguate the user query, at 303, an embodiment may, at 304, take no additional action. Additionally or alternatively, an embodiment may output a notification to the user (e.g., an audible notification, a visual notification, a combination thereof, etc.) that the user query is ambiguous and could not be properly processed. Conversely, responsive to disambiguating, at 303, the user query, an embodiment may, at 305, provide an appropriate response to the query.

The various embodiments described herein thus represent a technical improvement to conventional methods for disambiguating a user query. Using the techniques described herein, an embodiment may capture environmental audio and detect a user query comprising a deictic term. Subsequent to the environmental audio capture, an embodiment may analyze the environmental audio to apply a meaning to the deictic term. Once such a meaning is applied, an embodiment may disambiguate the user query and thereafter provide a responsive result to it. Such a method may therefore allow a user to more naturally interact with their device by allowing the user to form questions to it like they may otherwise ask another individual.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   capturing, using at least one sensor of an information handling device, environmental audio, wherein the environmental audio comprises a plurality of different data types;
   storing, in a rolling queue, a user-designated data type from the plurality of different data types, wherein the storing comprises ignoring, from the rolling queue, undesignated data types from the plurality of different data types;
   receiving, at an audio capture device associated with the information handling device, a user query, wherein the user query comprises at least one deictic term;
   disambiguating, using a processor and by analyzing the captured environmental audio associated with the user-designated data type stored in the rolling queue, the user query; and
   providing, based on the disambiguating, a response to the user query.

2. The method of claim 1, wherein the environmental audio corresponds to an audible conversation.

3. The method of claim 1, wherein the environmental audio corresponds to a sound stream produced by an entity selected from the group consisting of: another device, an object, a person, and an animal.

4. The method of claim 1, wherein the at least one deictic term corresponds to a deictic pronoun.

5. The method of claim 1, wherein the rolling queue comprises N-seconds worth of the environmental audio.

6. The method of claim 1, wherein the rolling queue comprises a predetermined amount of stored data.

7. The method of claim 1, wherein the disambiguating comprises:
   analyzing the environmental audio stored in the rolling queue responsive to receiving the user query;
   determining a context associated with the analyzed environmental audio; and
   applying a meaning to the at least one deictic term based at least in part on the determined context.

8. The method of claim 1, wherein the disambiguating comprises:
   analyzing the environmental audio responsive to capturing the environmental audio;
   determining, based on the analyzing, a running context associated with the environmental audio; and
   applying a meaning to the at least one deictic term based at least in part on the running context.

9. The method of claim 1, wherein the capturing comprises continuously capturing the environmental data.

10. An information handling device, comprising:
    a sensor;
    an audio capture device;
    a processor;
    a memory device that stores instructions executable by the processor to:
    capture environmental audio, wherein the environmental audio comprises a plurality of different data types;
    storing, in a rolling queue, a user-designated data type from the plurality of different data types, wherein the storing comprises ignoring, from the rolling queue, undesignated data types from the plurality of different data types;
    receive a user query, wherein the user query comprises at least one deictic term;
    disambiguate, by analyzing the captured environmental audio associated with the user-designated data types stored in the rolling queue, the user query; and
    provide, based on the disambiguating, a response to the user query.

11. The information handling device of claim 10, wherein the environmental audio corresponds to an audible conversation.

12. The information handling device of claim 10, wherein the environmental audio corresponds to a sound stream produced by an entity selected from the group consisting of another device, an object, a person, and an animal.

13. The information handling device of claim 10, wherein the at least one deictic term corresponds to a deictic pronoun.

14. The information handling device of claim 10, wherein the rolling queue comprises N-seconds worth of the environmental audio.

15. The information handling device of claim 10, wherein the rolling queue comprises a predetermined amount of stored data.

16. The information handling device of claim 10, wherein the instructions executable by the processor to disambiguate comprise instructions executable by the processor to:

analyze the environmental audio stored in the rolling queue responsive to receiving the user query;

determine a context associated with the analyzed environmental audio; and apply a meaning to the at least one deictic term based at least in part on the determined context.

17. The information handling device of claim 10, wherein the instructions executable by the processor to disambiguate comprise instructions executable by the processor to:

analyze the environmental audio responsive to capturing the environmental audio;

determine, based on the analyzing, a running context associated with the environmental audio; and applying a meaning to the at least one deictic term based at least in part on the running context.

18. A product, comprising:

a non-transitory storage device that stores code, the code being executable by a processor and comprising:

code that captures environmental audio, wherein the environmental audio comprises a plurality of different data types;

code that stores, in a rolling queue, a user-designated data type from the plurality of different data types, wherein the storing comprises ignoring, from the rolling queue, undesignated data types from the plurality of different data types;

code that receives a user query, wherein the user query comprises at least one deictic term;

code that disambiguates, by analyzing the captured environmental audio associated with the user-designated data type stored in the rolling queue, the user query; and code that provides, based on the disambiguating, a response to the user query.

* * * * *